United States Patent Office 3,000,938
Patented Sept. 19, 1961

---

3,000,938
α-CYCLOPROPYLBENZYLUREA
Warren J. Close, Waukegan, Ill., assignor to Abbott Laboratories, North Chicago, Ill., a corporation of Illinois
No Drawing. Original application Oct. 9, 1956, Ser. No. 614,803. Divided and this application Oct. 22, 1959, Ser. No. 16,908
1 Claim. (Cl. 260—553)

This invention relates to new chemical products, in particular, new derivatives of cyclopropyl aryl ketones.

This is a divisional application of Serial No. 614,803, filed October 9, 1956, now abandoned.

A copending application Serial No. 615,249, filed October 11, 1956, sets out a novel process for the economical preparation of γ-chloropropyl aryl ketones which can be used as intermediates for expedient conversion to cyclopropyl aryl ketones by conventional treatment with methanolic potassium hydroxide. The process for obtaining the cyclopropyl aryl ketones of the copending application is set out in the following sequence of reactions:

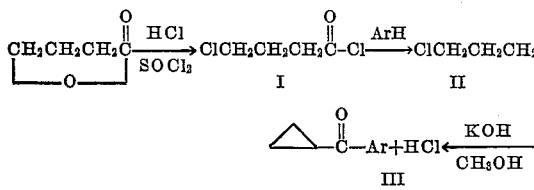

wherein Ar represents an aromatic hydrocarbon and H is a hydrogen atom in the nucleus of the aromatic hydrocarbon. The cyclopropyl aryl ketone III is obtained by treating II with potassium hydroxide and methanol. Novel derivatives of the cyclopropyl aryl ketone III exhibit definite activity as anticonvulsants and hypnotics. These compounds have the formula

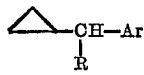

wherein Ar is a Friedel-Crafts reacting aromatic group and R is ureido.

Using cyclopropyl phenyl ketone as a starting material, it is possible to prepare related compounds by substitutions of the ketone group. The following example illustrates illustrates the preparation of such a derivative, but it should be understood that such preparation does not exclude the possible use of cyclopropyl aryl ketones other than cyclopropyl phenyl ketone as a starting material. The aromatic moiety of the cyclopropyl aryl ketone can be any aromatic compound which undergoes a Friedel-Crafts reaction to form said cyclopropyl aryl ketones in the manner heretofore disclosed, such as toluene, chlorobenzene, phenetole, naphthalene, thiophene, benzothiophene and the like as disclosed in said copending application.

EXAMPLE

α-Cyclopropylbenzylurea 9.2 grams (0.05 mole) of α-cyclopropylbenzylamine hydrochloride is dissolved in 40 cc. of water and treated with 4.9 grams (0.06 mole) of potassium cyanate in 20 cc. of water. The mixture is allowed to stand for several hours after which the formed product, α-cyclopropylbenzylurea, is separated by filtration in a yield of 8.0 grams (85%) having a melting point of 143–146° C.

*Analysis.*—Calcd. for $C_{11}H_{14}N_2O$: N, 14.7. Found: N, 14.9.

Others may practice the invention in any of the numerous ways which will be suggested by this disclosure to one skilled in the art. All such practice of the invention is considered to be a part hereof provided it falls within the scope of the appended claim.

I claim:
The compound α-cyclopropylbenzylurea.

References Cited in the file of this patent

Close: J. Am. Chem. Soc., vol. 79, pages 1455–8 (1957).